July 15, 1924.
A. R. COLSON
VEHICLE
Filed May 11, 1922        2 Sheets-Sheet 1
1,501,271
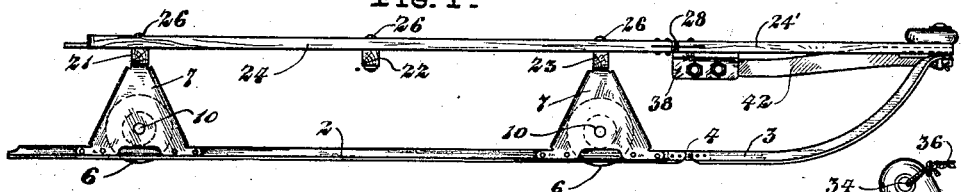
Fig. 1.
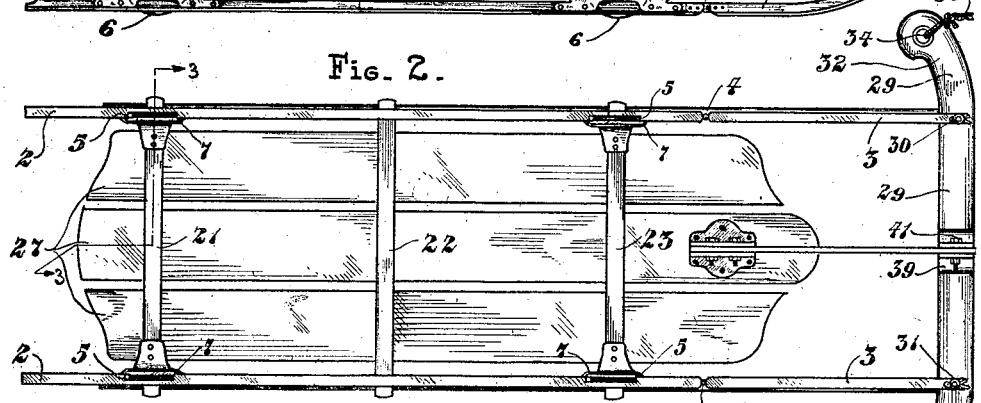
Fig. 2.
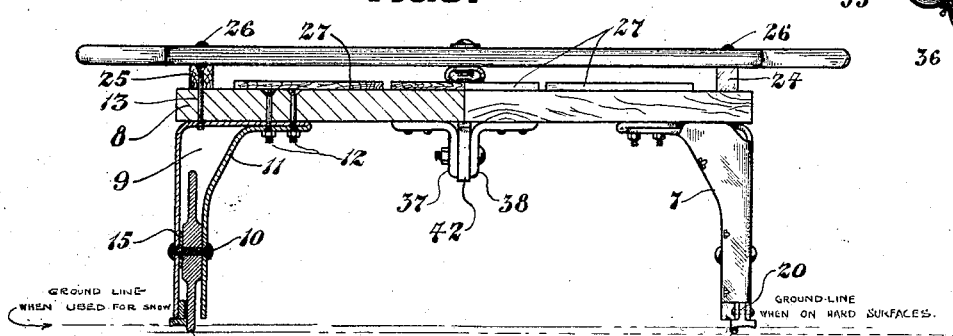
Fig. 3.
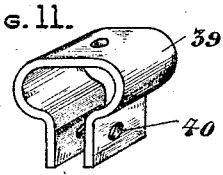
Fig. 11.
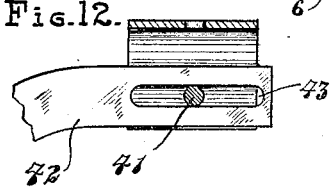
Fig. 12.
Fig. 13.
INVENTOR
AUGUSTUS R. COLSON
BY James N. Ramsey
ATTORNEY July 15, 1924.
A. R. COLSON
VEHICLE
Filed May 11, 1922　　　2 Sheets-Sheet 2
1,501,271
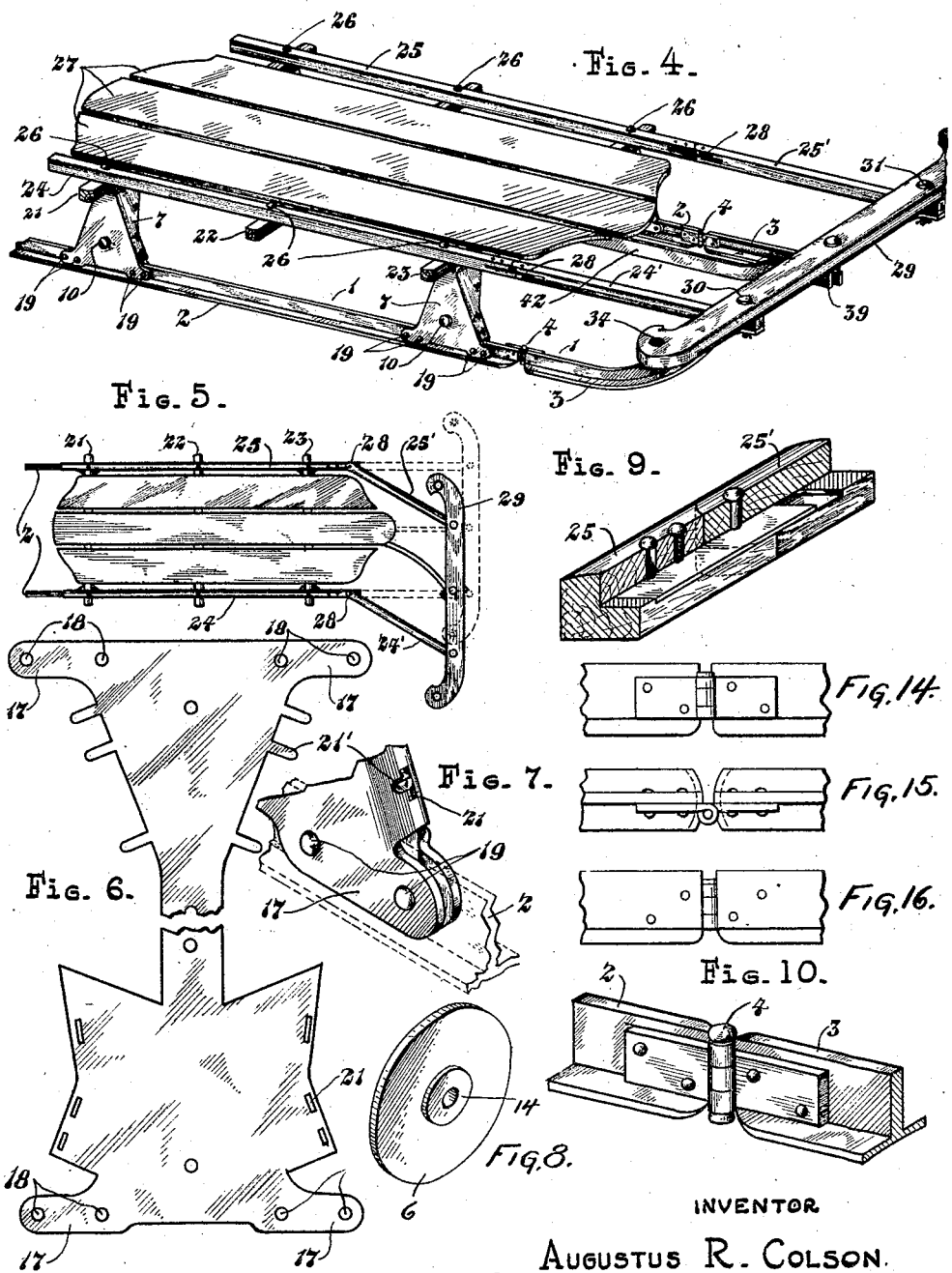
INVENTOR
Augustus R. Colson.
BY *James N. Ramsey*
ATTORNEY Patented July 15, 1924.

1,501,271

UNITED STATES PATENT OFFICE.

AUGUSTUS R. COLSON, OF CINCINNATI, OHIO.

VEHICLE.

Application filed May 11, 1922. Serial No. 560,060.

*To all whom it may concern:*

Be it known that I, AUGUSTUS R. COLSON, a citizen of the United States, residing at Cincinnati, in the county of Hamilton and State of Ohio, have invented certain new and useful Improvements in Vehicles, of which the following is a specification.

My invention relates to improvements in vehicles and more particularly to sleds, including coasting sleds especially adapted for children's use.

The objects of my invention are to provide simple, efficient, economical and easily operated vehicles of this type which are adapted to be readily and easily drawn or otherwise conveyed over the surface in either summer or winter or when the surface, consisting of ground, cement, stone or other hard substance, is partly covered with snow, ice or sleet or is bare or partly bare.

Another object of my invention is to provide means whereby a vehicle may be easily and quickly turned to right or left thus enabling the pilot to easily steer it to avoid obstructions or other conveyances and thus insure against accidents.

Other objects and advantages are obtained by means of my invention as will appear herein.

My invention consists in providing a sled with a plurality of wheels adapted to have slight tractive engagement with the tread surface so that when the vehicle is traveling over snow, ice or sleet the sled runners will principally engage the surface and bear the load of the sled and pilot but when the bare tread surface is being traversed the wheels only or principally will support the vehicle and pilot and cause it to readily and easily advance over the surface without marring the surface, such as a cement sidewalk, and which will also prevent the runners from dragging on bare surfaces.

My invention also consists in providing means whereby the vehicle may be readily turned to right or left for the purpose of easily and conveniently steering it.

My invention further consists in the construction, combination and arrangement of parts as herein set forth and claimed.

In the drawings:

Fig. 1 is a side elevation of the vehicle embodying my invention;

Fig. 2 is a bottom view thereof;

Fig. 3 is a rear end elevation partly in section on the line 3—3 of Fig. 2;

Fig. 4 is a perspective view of the vehicle.

Fig. 5 is a plan view showing the front section turned to the right;

Fig. 6 is a plan view of the blank out of which the housing support is formed;

Fig. 7 is an enlarged perspective view of the lower connection of the sled knee with the runner;

Fig. 8 is a perspective view of one of the wheels;

Fig. 9 is a sectional perspective view of the hinge connection for the front and rear frame sections;

Fig. 10 is an enlarged perspective view of the hinge connection between the front and rear sections of the runner;

Fig. 11 is a perspective view of the pivoted bracket for spring bar;

Fig. 12 is a central vertical section of the pivoted bracket with front end of spring bar shown in elevation slidably mounted therein;

Fig. 13 is an inner perspective view of the left rear runner showing one of the recesses and a portion of the housing support, its position on the runner being indicated by dotted lines;

Fig. 14 is an enlarged inside elevational view showing the form of the runners at the hinged ends thereof;

Fig. 15 is a plan view thereof; and

Fig. 16 is an outside elevational view showing the form of the runners at the hinged ends thereof.

In the embodiment of my invention as illustrated and which shows a preferred construction I provide runners 1 which may be of the usual construction but which are preferably formed of straight rear sections 2 and front curved sections 3 connected by hinge pivots 4 to permit the front sections to be turned laterally to right or left, relative to the rear section. The front end of each rail 24 and 25 is curved or concave and the rear end of each rail 24' and 25' is curved or convex and the front and rear sections of each runner are pivotally connected together by a strap hinge having its pivot arranged in a plane between said sections, (Fig. 10). Each straight rear section is preferably provided with two or more vertical recesses 5 to permit the periphery of each wheel 6 to project slightly below the runner and to form traction with the surface for supporting the vehicle to readily traverse bare surfaces without dragging and without cutting or marring the bare surface over which the vehicle moves.

Each wheel 6 is preferably mounted in housing 7 which also serves as a support and brace for the rear frame 8 of the vehicle. Each housing 7 comprises a blank as shown in Fig. 6 but which is bent upon itself to form chamber 9 in which wheel 6 is pivotally mounted upon journal or axle 10 supported in the side walls of said housing and extending transversely across said chamber. The upper end of housing 7 is extended inwardly to form a brace 11 and is connected to frame 8 by bolts 12 and screw bolt 13.

The wheel 6 comprises a disk having a boss 14 upon each side to provide an extended bearing surface for the axle and to suitably space the wheel from the vertical walls of the housing. Washer 15 is preferably mounted upon the axle and interposed between the wheel and the wall of the housing to further space the wheel therefrom. The housing is provided with ears 17 each having holes 18 therethrough to receive bolts or rivets 19 therethrough and through holes 20 in the sled runner whereby the housing is securely attached to the runner.

The housing is bent to the form shown and interlocked by means of the slots 21 adjacent one edge and tongues 21' on the other edge extending through said slots, respectively, and bent down upon the outer wall as clearly shown in Fig. 7.

The frame 8 may be of ordinary construction having cross bars 21, 22 and 23 on which are mounted side rails 24 and 25 secured by rivets 26. Seat boards 27 are mounted on cross bars 21, 22 and 23 preferably substantially as shown. The side rails in the construction illustrated are formed of front and rear sections pivotally secured together by hinges 28.

The front end of each rail is preferably formed concave and is provided with a horizontal slot extending inwardly from its end with vertical holes through the rail whereby a flat hinge member may be inserted in said slot and secured therein by bolts or rivets. The rear end of each front rail is preferably curved or formed convex to engage the concave ends of said rear rails and each is provided with a horizontal slot to receive the projecting end of said frame hinge member and said front rail has a hole extending vertically therethrough to receive a pivot pin which also engages a hole in the frame hinge member whereby each front rail is pivotally connected to its rear rail upon each side, as clearly shown in Fig. 9.

The front side rails 24' and 25' are attached to steering bar 29 and front ends of the runners by pivots 30 and 31, respectively. Steering bar 29 projects outwardly from each side of the vehicle and is preferably curved backwardly to provide foot rests 32 and 33 and is also provided with eyelets 34 and 35 for attachment of rope 36 by which the vehicle may be drawn or by which it may be steered by the pilot sitting upon the rear part of the vehicle and simply pulling on the right or left side as occasion requires, thereby turning the front end of the vehicle upon the pivotal connections, as shown in Fig. 5.

I preferably provide a bracket composed of two angle irons 37 and 38 spaced apart from each other and attached to the lower side of the rear frame section. I also prefer to provide a bracket 39 formed of substantially the shape shown in Fig. 11 and pivotally attached to the lower side of steering bar 29 with hole 40 extending through each downwardly projecting flange to receive bolt 41. The spring bar 42 having a slot 43 in its forward end is slidably mounted in pivot bracket 39 on bolt 41 and is fixedly attached to bracket 37—38, for the purpose of normally holding the front section in alignment with the rear section but which will yield under pressure of the pilot when actuating either end of the steering bar to turn the vehicle to right or left.

When the pressure of the pilot is released the spring bar serves to automatically return the front section to parallel position with the rear section as shown by dotted lines in Fig. 5.

While I have shown and described a particular embodiment of my invention it will be apparent that it also includes various modifications without departure from the scope or spirit of the claims.

What I claim as new and desire to secure by Letters Patent is:

1. A vehicle comprising rigid runners having side recesses respectively therein, a plurality of spaced apart housing supports mounted over said recesses respectively and attached to said runners, a wheel mounted in each housing support and adapted to project slightly below said runners and a frame mounted on said housing supports, substantially as set forth and for the purposes specified.

2. A vehicle comprising runners, a frame, a plurality of spaced apart housing supports secured to and between said runners and frame, respectively, and a wheel in each housing support adapted to extend slightly below the runner in fixed relation thereto, substantially as set forth and for the purposes specified.

3. A vehicle comprising runners each having a front hinged section, a steering bar, a frame having front rails pivoted thereto and to said steering bar, supports connected to and between said runners and said frame, respectively, a wheel mounted in each support and extending slightly below said runners, respectively, substantially as set forth and for the purposes specified.

4. In a vehicle, runners each having sections pivoted together whereby the front section is adapted to move laterally, a frame having sections pivoted together whereby the front section is adapted to move laterally, supports connecting said runners and said frame, wheels pivotally attached to said supports and having their peripheries extending slightly below said runners, a steering bar pivoted to the front ends of said front section and runners, respectively, and having foot rests whereby said bar may be turned upon said pivots to move the front end of said vehicle laterally to right or left, as desired.

5. In a vehicle, solid metal runners each having front and rear sections pivoted together whereby said front section is adapted to move laterally relative to said rear section, metal supports spaced apart from each other upon said rear section, a frame having front and rear sections pivoted together and having its rear section mounted upon said supports in spaced apart relation from said runners and the front end of its front section pivoted to the front runners, and a steering bar pivoted between its ends to said front section and to said runners, substantially as set forth and for the purposes specified.

6. In a vehicle, a housing support comprising a piece of sheet metal stamped or bent upon itself and having its sides spaced apart from each other to form a chamber and tapering upwardly from bottom to top and bent laterally to form supporting and bracing means with holes therethrough to receive attaching means and having extending ears at its lower end with holes therethrough whereby said housing support may be attached to the runner and each side member having a hole therethrough and an axle therein whereby the wheel is adapted to be supported in said chamber, substantially as set forth and for the purposes specified.

7. In a vehicle, runners having recesses therein, a plurality of housing supports attached to each of said runners mounted over said recesses, a wheel mounted in each housing support and adapted to project through said recesses slightly below said runners, and a frame suitably mounted.

8. In a vehicle, a rear section having a pair of side rails and a pair of runners, a front section having a pair of side rails and a pair of runners, means for pivoting together the respective front and rear rails, means for pivoting together said front and rear runners, respectively, said rear runners being transversely curved at their hinged end and tapered upwardly from the bottom.

9. In a vehicle, a rear section having a pair of side rails and a pair of runners, a front section having a pair of side rails and a pair of runners, means for pivoting together the respective front and rear rails, means for pivoting together said front and rear runners, respectively, said rear runners being transversely curved at their hinged end and tapered upwardly from the bottom, and said front runners being transversely curved upwardly from the bottom.

10. In a vehicle, runners each having front and rear sections pivoted together at their ends whereby said front section is adapted to move laterally relative to said rear section, supports upon said rear section, a frame having front and rear sections pivoted together and having its rear section mounted upon said supports and the front end of its front section pivoted to the front runners, a spring attached to the rear section and slidably connected to the front section and a steering bar pivoted between its ends to said front section and to said runner, substantially as set forth and for the purposes specified.

AUGUSTUS R. COLSON.